(12) United States Patent
McLachlan et al.

(10) Patent No.: US 9,530,133 B2
(45) Date of Patent: *Dec. 27, 2016

(54) ADAPTIVE SECONDARY AUTHENTICATION CRITERIA BASED ON ACCOUNT DATA

(71) Applicant: Apple Inc., Cupertino, CA (US)

(72) Inventors: Jonathan G. McLachlan, San Francisco, CA (US); Augustin J. Farrugia, Los Altos Hills, CA (US); Nicholas T. Sullivan, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/685,429

(22) Filed: Apr. 13, 2015

(65) Prior Publication Data
US 2015/0220926 A1    Aug. 6, 2015

Related U.S. Application Data

(62) Division of application No. 13/731,935, filed on Dec. 31, 2012, now Pat. No. 9,043,887.

(51) Int. Cl.
*G06F 21/31* (2013.01)
*G06Q 20/40* (2012.01)
*H04L 29/06* (2006.01)

(52) U.S. Cl.
CPC .......... *G06Q 20/4014* (2013.01); *H04L 63/08* (2013.01)

(58) Field of Classification Search
USPC .................... 726/5, 6, 7, 26; 705/2
See application file for complete search history.

(56) References Cited

U.S. PATENT DOCUMENTS

| | | | |
|---|---|---|---|
| 6,539,269 B1 * | 3/2003 | Jarrow | G09B 5/00 434/107 |
| 7,231,657 B2 | 6/2007 | Honarvar et al. | |
| 7,748,029 B2 | 6/2010 | Ross | |
| 8,551,186 B1 * | 10/2013 | Strand | G06F 21/74 726/35 |
| 2003/0212909 A1 * | 11/2003 | Chandrashekhar | H04L 63/1433 726/25 |

(Continued)

*Primary Examiner* — Sayed Beheshti Shirazi
(74) *Attorney, Agent, or Firm* — Blakely, Sokoloff, Taylor & Zafman LLP

(57) ABSTRACT

An authentication challenge system for performing secondary authentication for an account associated with an online store is described. In one embodiment, the authentication challenge system includes a question generation engine, which can derive a series of questions based upon activity associated with a user account of an online store; a network interface, which can transport the series of one or more questions derived by the question generation engine to authenticate the user to the online store; a confidence engine, which can determine a required confidence level for a successful authentication, and can compute a confidence score of the user identity; and a quality engine, which can adjust the question generation engine and the confidence engine based upon an analysis of question and answer metrics across multiple accounts of the online store. The online store can include digital media, such as music, movies, books or applications for electronic computing devices.

20 Claims, 9 Drawing Sheets

(56) References Cited

U.S. PATENT DOCUMENTS

| | | | |
|---|---|---|---|
| 2007/0179854 A1* | 8/2007 | Ziv | G06F 21/10 705/14.25 |
| 2008/0040276 A1 | 2/2008 | Hammad et al. | |
| 2008/0307515 A1 | 12/2008 | Drokov et al. | |
| 2009/0287763 A1* | 11/2009 | Svendsen | G06Q 30/02 709/203 |
| 2010/0122329 A1 | 5/2010 | Jakobsson et al. | |
| 2010/0158206 A1 | 6/2010 | Caceres et al. | |
| 2010/0250556 A1* | 9/2010 | Park | G06F 17/30699 707/749 |
| 2011/0082770 A1 | 4/2011 | Krishnamoorthy et al. | |
| 2011/0112852 A1* | 5/2011 | Ware | G06F 19/345 705/2 |
| 2011/0191838 A1* | 8/2011 | Yanagihara | G06F 15/16 726/7 |
| 2011/0264691 A1* | 10/2011 | Migita | G06Q 10/00 707/769 |
| 2012/0005733 A1* | 1/2012 | Ross | G06F 21/33 726/6 |
| 2012/0216260 A1* | 8/2012 | Crawford | G06F 21/31 726/5 |
| 2012/0265587 A1* | 10/2012 | Kinkead | G06Q 30/02 705/14.1 |
| 2013/0029765 A1* | 1/2013 | Parks | G06Q 50/01 463/42 |
| 2013/0055346 A1* | 2/2013 | Singh | G06F 21/34 726/3 |
| 2013/0110822 A1* | 5/2013 | Ikeda | G06F 17/3087 707/722 |
| 2013/0122481 A1* | 5/2013 | Rovner | G09B 7/04 434/350 |
| 2013/0226698 A1* | 8/2013 | Cochinwala | G06Q 30/06 705/14.53 |
| 2014/0127665 A1* | 5/2014 | Arai | G09B 7/06 434/362 |
| 2015/0125842 A1* | 5/2015 | Shim | G06F 21/31 434/322 |

* cited by examiner

ADAPTIVE SECONDARY AUTHENTICATION CRITERIA BASED ON ACCOUNT DATA This application is a divisional of co-pending U.S. application Ser. No. 13/731,935 filed on Dec. 31, 2012.

BACKGROUND OF THE DISCLOSURE

An online service provider is an organization or individual that provides digital or physical goods or services to customers, for which at least a portion of the interaction between the provider and the customer is performed through a computer network. Customers of the online service provider typically interact with the service, which can also be an online store, via some form of user account. Each customer's previous interactions are typically stored in some data structures or databases associated with the customer or user account of the online service provider, or online store. To differentiate between customers, an account identifier is typically assigned to each account. This identifier can be a specific number, a customer name or address, or an email address.

Customers provide their account identifier in order to make transactions that are associated with their account. A security issue can arise if others know the identifier associated with a customer; a person other than the legitimate account user may attempt to fraudulently interact with the service as if they are an authorized user of the account. To authenticate the identity of a given customer, services typically employ a password system as a form of authentication, in which the customer presents a password with the account identifier to prove their identity as a legitimate customer. This is an example of single-factor authentication. In single factor authentication, if the primary authentication is compromised, for example, if customer's password is stolen, someone can use the authentication method to fraudulently access the account.

SUMMARY OF THE DESCRIPTION

The embodiments described relate to a system and associated methods for an authentication challenge system for performing secondary authentication for an account associated with an online service provider, such as an online store for digital media and applications. In one embodiment, the authentication challenge system includes a question generation engine, which can derive a series of questions based upon activity associated with a user account of an online store; a network interface, which can transport the series of one or more questions derived by the question generation engine to authenticate the user to the online store; a confidence engine, which can determine a required confidence level for a successful authentication, and can compute a confidence score of the user identity; and a quality engine, which can adjust the question generation engine and the confidence engine based upon an analysis of question and answer metrics across multiple accounts of the online store. The online store can include digital media, such as music, movies, books or applications (e.g., apps) for electronic computing devices.

In one embodiment, the question engine can generate questions for use during secondary authentication by accessing a purchase history associated with an account of an online media store; deriving a set of questions based on the purchase history of a unique identifier associated with the account, including the digital media purchase history of the account; deriving a set of questions based on a presumed media genre preference associated with the unique identifier; and filtering questions from one or more sets of questions based on privacy settings. In one embodiment, the question generation engine can be configured to derive questions based on the location history of a device associated with the unique identifier of an account of the online store.

In one embodiment, the confidence engine can determine a confidence value associated a unique identifier associated with an account on the online store that is proportional to the authentication system's degree of confidence that the unique identifier associated with the account is being used by a legitimate or authorized user. The confidence engine can determine this value by examining details such as the account activity history associated with the unique identifier, the devices used with the account, the networks used to access the online store, and the geographic locations from which the device is used to access the online store. In one embodiment, a primary authentication confidence factor based on primary authentication statistics associated with the unique identifier can also be used.

In one embodiment, the confidence engine can compute a score to model a risk of account fraud based on account activity. The confidence engine can compute the score by assigning a score to account activity, such as purchasing media from the online store, purchasing in-app assets via the online store, restoring past purchases from the online store; viewing financial information associated with the account; and changing financial information associated with the account.

In one embodiment, the quality engine can adjust the question generation engine and the confidence engine based upon an analysis of question and answer metrics by analyzing the frequency which certain questions or question types are asked, and the frequency which certain questions or question types are answered correctly, and applying a quality score to the questions based on the analysis of the question metrics. In one embodiment, the quality score can be determined by considering metrics associated with the difficulty level of a question as assessed against legitimate and illegitimate users.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
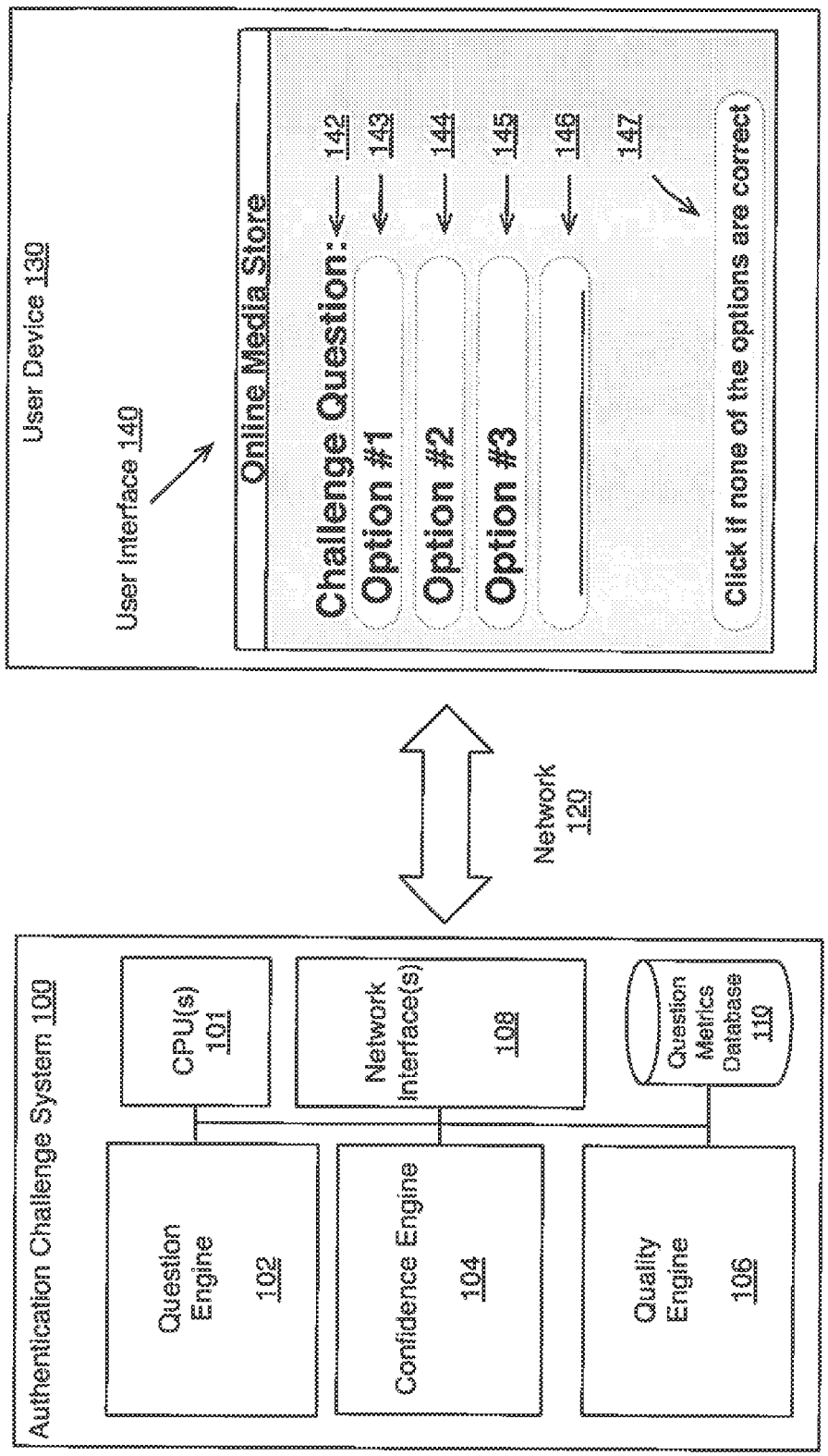
FIG. 1 is a block diagram of one embodiment of an authentication challenge system for online service providers.

While compromising the primary authentication method can defeat single factor authentication methods, it is possible to use multi-factor authentication to further secure a system if the primary credentials are compromised. Multi-factor authentication is the use of other means to authenticate the user beyond password based primary authentication methods. Methods of secondary authentication include physical objects such as smart cards, biometrics, pre-selected challenge questions, or one-time passwords. In various embodiments, a mechanism for performing secondary authentication is described which can be used by an online service provider to validate the identity of a customer by leveraging account specific details, such as the history of transactions between the customer and the online service provider, the devices used by the user to access the online store, the networks over which the device communicates to access the online store, and the geographic locations from which the user accesses the online store.

When a service provider keeps records of transactions with customers, the information about previous transactions can be stored in groupings based on the individual accounts associated with the customer, and the data set stored by the service provider can be very rich. For example, an online music store could potentially have records including, but not limited to: purchase history, album or song reviews, star ratings, number of plays of a song, number of downloads, gifting history, computer configurations used, transfers to portable players, streams to set-top boxes, and geographical location at time of purchase. This deep pool of user information can be used to create one or more embodiments of the interactive secondary authentication mechanism illustrated. This authentication challenge system can simplify account creation by avoiding the need for the user to select and remember specific account security questions, which can have answers that could be known or discoverable by others, or, in some cases, forgotten by the legitimate user at a later date. Instead, the system can generate questions based on the users account history that are most likely known only to legitimate users of the account.

Various aspects of the authentication challenge system, and associated methods of operation, will be described with reference to details discussed below. The accompanying drawings will illustrate the various embodiments. In the figures and description to follow, reference numbers for system components or operations are indicative of the figure in which the reference may be found. For example, references beginning with 100 may be found in FIG. 1, while references beginning with 200 maybe found in FIG. 2, and so forth. The following description and drawings are illustrative of the invention, however, they are not to be construed as limiting the invention. To provide a thorough understanding of the various embodiments in the present invention, numerous specific details are described below. However, in certain instances, well-known or conventional details are not described, so as to provide a clear and concise discussion of embodiments of the present invention. Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

FIG. 1 is a block diagram of one embodiment of an authentication challenge system for online service providers. In one embodiment, the Authentication Challenge System 100 contains components including one or more general-purpose central processing units 101, and specialized logic units including a question engine 102, a confidence engine 104, a quality engine 106, one or more network interfaces 108, and a question metrics database 110. The Authentication Challenge System 100 can use the one or more network interfaces 108 to transmit authentication questions over a network 120 to a user device 130. The user device can display, via a user interface 140, a series of challenge questions generated by the authentication challenge system 100. The specialized logic units (e.g., question engine 102, confidence engine 104, quality engine 106) can be implemented using one or more application specific integrated circuits (ASIC); a digital signal processor (DSP); shader threads on a general purpose graphics processing engine (GPGPU) or a many integrated core (MIC) processor; or can be embodied as instructions on non-transitory machine-readable media for execution by a general purpose processor.

The question generation engine 102, in one aspect, can use the set of information included in the history and details of an account, or a unique identifier associated with the account, of the online service provider, in this example, an online media store, and derive questions used to authenticate the user. One or more challenge questions 142 can be presented to a customer at the user device 130, and multiple answer choices (e.g., Option #1 143 to Option #3 145) can be available for the customer to select. The exact number and form of the questions, along with the number of answers presented can vary. Free form answers (e.g., 146) in which the user supplies the entire answer, rather than selecting from one of the presented options can be available. Additionally, or alternatively to a free form answer 146, an option 147 that indicates that none of the offered answer options are correct can be included as a possible answer option.

In one embodiment, the question generation engine 102 determines such details as the template of question style (e.g., multiple choice, question & answer, Boolean decision, or other question forms). The question generation engine can also determine the phrasing of the answers (e.g., granularity of time, granularity of geography, multimedia questions) and establish correctness criteria, such as whether answers are case sensitive, or the duration of any question timeout periods. The question generation engine 102 can also adjust the questions to improve question quality, as determined by a machine-learning algorithm of the quality engine 106. In one embodiment, the question generation engine can filter questions presented to a user based on privacy considerations of the information used in the question, so that the user can select a subset of information that will not be used to generate questions (e.g., location history).

While a password based primary authentication method is determined to be successful if the correct password is entered, the secondary authentication system, according to one embodiment of the invention, uses a sliding scale to determine if the entered answers are correct. In one embodiment, the confidence engine 104 determines an initial identity confidence in the user based on recent account activity, to detect user actions that correlate to a potential attempt to compromise an account.

For example, if a unique identifier associated with an account has recently been accessed from one or more new devices that have not previously been used to access the account, the identify confidence level associated with the unique identifier can be reduced, because the likelihood that the account has been compromised has increased. If the new device is accessing the account from a new network, the identify confidence level can be further reduced, because it is less likely, though still possible, a legitimate user is attempting to access the account under these circumstances. However, if location services indicate that a device is attempting to access the account from a new, or unusual geographic location according to the account history, then the confidence engine 104 can assign a low identity confidence to the unique identifier, because under these circumstances it is possible the primary account credentials have been compromised, and further authentication is desirable before additional account activity can be continued.

The confidence engine 104 can score these circumstances individually, or can use a scoring system based on the totality of circumstances. In one embodiment, the size of the reduction in confidence caused by each successive suspicious activity can be increased if multiple suspicious circumstances are detected. In one embodiment, the success or failure of the primary authentication system is also considered. For example, if an account is accessed from a suspicious network, in a suspicious geographic location, after successive failed password authentication attempts, the confidence engine 104 can take those circumstances into account when computing the initial identify confidence level. If a user or device is ultimately able to successfully authenticate against the primary authentication method under the circumstances described, the authentication challenge system 100 can trigger a round of secondary authentication, to provide an additional layer of security. However, the system is not limited to low confidence level situations, and the authentication challenge system 100 can be configured to perform secondary authentication under multiple circumstances.

In one embodiment, the confidence engine 104 can compute a confidence threshold that should be exceeded if a user is to perform a specific account activity, and the authentication challenge system can compare the identity confidence level with the confidence threshold of the requested account activity. For example, using the account to purchase a free app from an online app store can be assigned a low confidence threshold, such that a user may not trigger the secondary authentication system. Alternatively, purchasing an application that costs $500 (e.g., five hundred United States Dollars at 2012 values) can be assigned a high confidence threshold, such that a user would likely trigger the secondary authentication system under any circumstances. However, if a unique identifier associated with an account on an online store, for example, an online app store, has a low initial identity confidence level, even the purchase of a free app, or attempting to rate or review a free app on the online store, can trigger the secondary authentication system. This is because, in some circumstances, fraudulent activity can occur on an online app store where a large number of accounts are compromised and used to artificially uprate a specific application. Similarly, a large number of accounts can be compromised to purchase media for a specific artist from an online media store. The authentication challenge system 100 can be used in such circumstances to provide an additional level of security using account specific authentication methods to reduce the likelihood an account with compromised primary credentials is used to perform such fraudulent activity.

In one embodiment, a quality engine 106 can be used by the authentication challenge system 100 to analyze question and answer metrics stored in a question metrics database 110. The analysis of the metrics can be used to modify questions to improve the likelihood of detecting accounts with compromised credentials. The analysis of the answer metrics can be performed across a large number of different user accounts to, for example, weed out poor or difficult questions which fail to authenticate proper legitimate users, or which allow improper users (e.g., a malicious attacker) to be authenticated. In one embodiment, a machine-learning algorithm that learns from the type and frequency of questions determines a question quality score. The question quality score can be used to optimize the questions to increase the □difficulty of the questions from the perspective of a malicious attacker, or to decrease the difficulty of the question from the perspective of a legitimate user of the account. The quality engine 106 can then feed the quality scores back to the question engine 102, and the question engine can use the quality scores to produce secondary authentication questions that are easy for a legitimate user to answer, yet are difficult for illegitimate users to answer. Spreading the analysis across a large number of user accounts can improve the process of weeding out poor or difficult questions.

Figure 2:
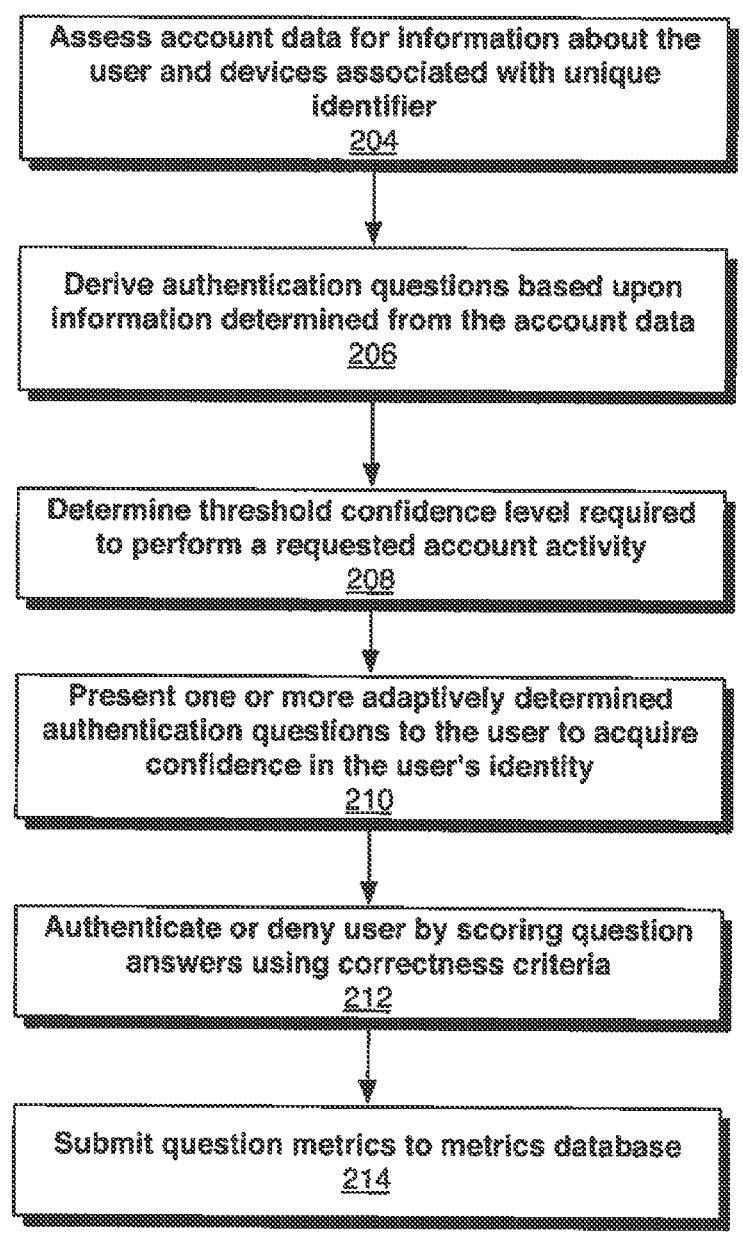
FIG. 2 is a flow diagram illustrating an overview of one embodiment of the authentication challenge system.

FIG. 2 is a flow diagram illustrating an overview of one embodiment of the authentication challenge system 100. Although the processes described in FIG. 2, and in the Figures to follow, are described in terms of sequential operations, it should be appreciated that some of the operations described may be performed in a different order. Moreover, some operations may be performed in parallel rather than sequentially. In one embodiment, the authentication challenge system 100 operates to access account data for information about an account on an online store, and devices associated with the account, as shown at block 204. The system can use that account data to perform an operation 206 to derive authentication questions based upon information associated with the account, such as the most recent purchase form the online store using the account, or the most frequently used device associated with the account. In operation 208, the authentication challenge system can use the confidence engine 104 to determine a threshold confidence level required to perform an account activity requested by a unique identifier associated with the account. In one embodiment, a user has successfully authenticated against a primary authentication method, and is requesting to perform an account activity (e.g., changing credit card information) that has a high confidence threshold, and the authentication challenge system 100 can perform an operation 210 to present one or more adaptively determined authentication questions to the user to acquire a degree of confidence in the user's identity, or to acquire a degree of confidence that the user is a legitimate user of the account. Successive questions can be offered to the user until the authentication challenge system 100 has sufficient data to authenticate or deny the user.

In one embodiment, the question engine 102 can provide correctness criteria along with generated questions for use in scoring answers. Using such criteria, one embodiment of the authentication challenge system 100 can perform an operation 212 to authenticate or deny a user by scoring the supplied answers using correctness criteria supplied by the question engine 102. For example, the question engine 102 can indicate that all answers are case sensitive, where applicable. In such a circumstance, the quality engine 106 may have determined that legitimate users are likely to answer a given question using the correct capitalization, but an individual who has compromised the account is not likely to use proper capitalization.

In one embodiment, the authentication challenge system can use the quality engine 106 to perform meta-analysis of the effectiveness of the questions generated by the question engine 102. Such meta-analysis can be enabled using operation 214, which, from time to time, after a user has answered a series of questions, can submit question metrics to a metrics database. Question metrics can include information such as the frequency a certain type of question is asked, the frequency a certain type of question is answered correctly, the frequency a certain type of question is answered incorrectly, the frequency a certain type of question is filtered by privacy settings, the average difficulty of questions scored from a legitimate user perspective, the average difficulty of questions scored from an illegitimate user perspective, etc. Any number of question metrics can be used, and the system can adapt in real time to determine new metrics.

Using the above system and method of operation, when a user with an account on an online media attempts to purchase, for example, a $50 app from the Mac App Store, provided by Apple Computer, Inc. of Cupertino, Calif., the user is prompted for their password as a primary authentication method. In this instance, the user has not made any previous purchases from the user's device, and secondary authentication is triggered. □The authentication challenge system 100 notices a history of recent purchases, using the same account, from an online media store associated with the app store (such as, the iTunes Media Store also provided by Apple Computer, Inc. of Cupertino, Calif.). The authentication challenge system 100, using the question engine 102, can generate a series of question about these purchases, such as "Which one of the following have you recently purchased (select all that apply): (a) . . . (b) . . . (c) . . . (d) . . . (e)." In one embodiment, the user can interact with the media, playing a sample of each. Based on the initial identify confidence level, the user may have to correctly answer a series of questions before the system gains sufficient confidence in the identity of the user.

In one embodiment, the degree of confidence adjustment after a successfully answered question can be tuned based on the quality score of the question as scored by the quality engine 106. For example, if a certain question is almost always answered correctly by users while accessing the account from typical network for a user, from a typical device of the user, at a typical geographic location for a user, the machine learning algorithm of the quality engine 106 may presume that that type of question is an "easy" question for legitimate users. An incorrect answer for that question may trigger a greater than normal loss of confidence that the user is a legitimate user. In one embodiment, additional secondary authentication methods can be presented, until the authentication challenge system has confidence in the legitimacy or illegitimacy of the user. If the system considers the user to be legitimate, the user can be fully authenticated, and the purchase or account action can be allowed to proceed. If the system concludes that the account has been compromised due to one or more incorrect answers, the system can deny access to the account, either for a period of time, or until unlocked by the user via a tertiary authentication method, such as a call to customer support for the online media store. In one embodiment, various alerts can be configured such that if the account becomes locked due to a confidence failure, the user can be messaged via e-mail, SMS, or some other messaging system, to notify the user of the account that the primary authentication credentials may have been compromised.

In the figures below, the logic flow of the question engine 102, confidence engine 104, and quality engine 106 of one embodiment of the authentication challenge system 100 are examined in further detail.

Figure 3:
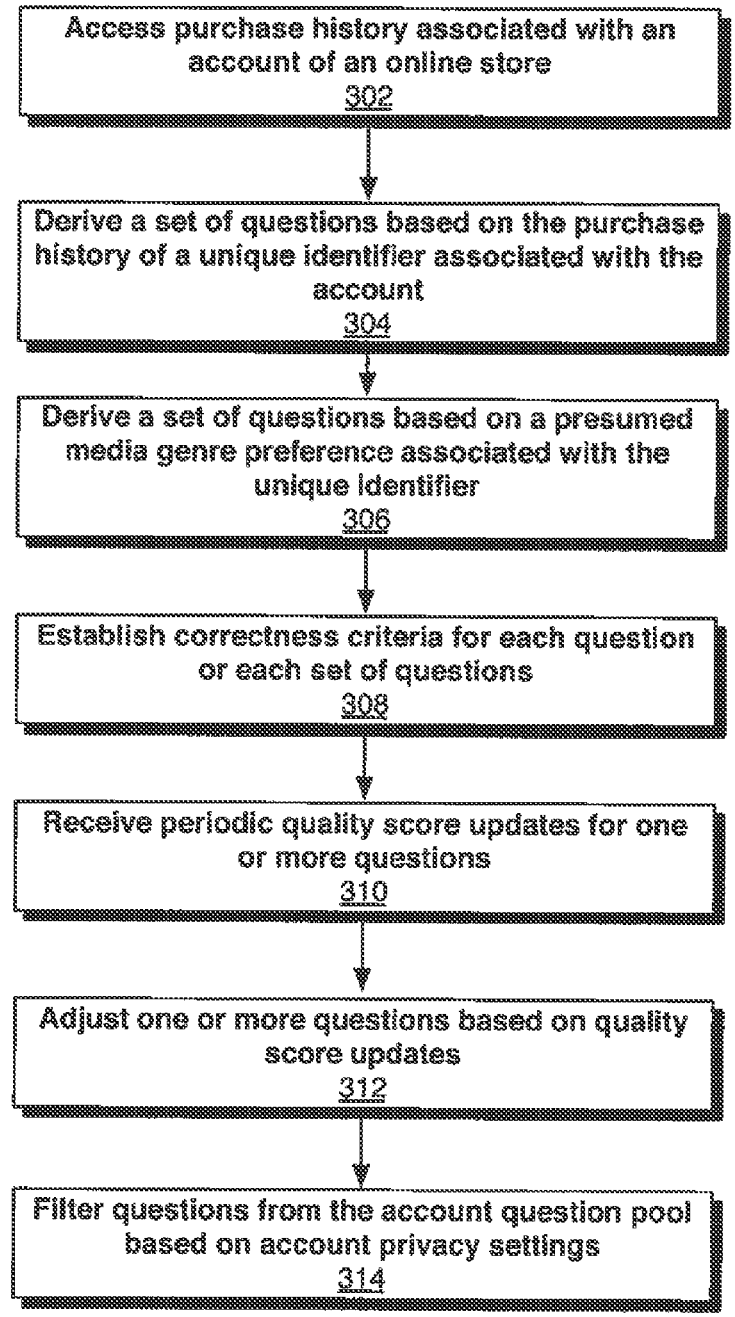
FIG. 3 is a flow diagram of the question engine logic according to one embodiment.

FIG. 3 illustrates an example logic flow of the question engine 102 according to one embodiment. In one embodiment, the question engine 102 has an example question engine logic flow 300 that, as shown at block 302, accesses the purchase history associated with an account of and online store. For example, an online media store, such as iTunes Media Store provided by Apple Computer, Inc. of Cupertino, Calif., allows users with an account on the media store to purchase music, and other digital multimedia data, in a form suitable for storage and playback using portable music players, smart phones, tablet computers, and personal computers. As users purchase media using the online media store, a transaction history associated with the account is generated. The account can have a unique identifier associated with the account that identifies the user specifically, and a transaction history can be associated with that unique identifier. As illustrated at block 304, the question engine 102 can use various algorithms to derive a set of questions based on the purchase history of the unique identifier associated with the account.

In one embodiment, the question engine 102 has logic to derive a set of questions based on a presumed media genre preference associated with the unique identifier, as shown at block 306. As a user makes purchases from the media store using the unique identifier, the general pattern of purchases creates a dataset that can be analyzed by the question engine 102 to generate a set of presumed media genre preferences. For example, a user may prefer music or artists in a specific genre (e.g., Electronic Dance Music, Hip-Hop/Rap, Indie Rock, etc.) and generally purchases music of that type. In one embodiment, a music player application on the user's device can be linked to the online media store and, with the permission of the user, can submit data about the artists and genres of the music stored in a media library on user's device.

In one embodiment, multimedia products, such as digital versions of television shows or movies are also available for purchase via the online media store. The user's preferences, as presumed by purchase history or multi-media library content can also be analyzed by the question engine to derive questions for use in secondary authentication. For example, if the user appears to prefer a certain television show, one or more secondary authentication questions can be generated using information from the show. For example, the question engine 102 can generate a question asking the user to select the host of a particular late night talk show. If, for example, a user has purchased an entire season of a particular television program through the media store, the question engine 102 can ask the user to select the name of one of the actors or actresses on a television program. In one embodiment, a question engine configured to generate questions with freeform user entered answers can ask the user to type in the name of a main character, or the name of an actor or actress associated with the main character.

One embodiment of the question engine 102 can have logic to perform an operation 308 that establishes the correctness criteria associated with the answer for a question when the question is generated. This feature can be used, such as in the case of questions with freeform answers, to determine if specifics such as capitalization, or precise spelling matter. The question engine 102 can tune this logic based on feedback from the quality engine 106 if, for example, the metrics reveal that legitimate users, on occasion, enter a common misspelling of the specified answer. At block 310 the question engine 102 can receive periodic quality score updates for one or more questions for which metrics are available in the question metrics database 110. This can include the aforementioned feedback regarding common misspellings associated with a freeform answer, and can also include answer metrics such as the frequency in which a specific question, or question type, is answered correctly or incorrectly by users with a high confidence level, and the frequency in which a specific question or question type is answered correctly or incorrectly by users with a low confidence level. Metrics can include data that is specific to the unique identifier associated with the account, or generalized across multiple users of the online media store. In one embodiment, the question engine 102 can perform an operation 312 that adjusts one or more questions based on the quality score updates. Questions can be tuned, in general, such that they are easy for legitimate users to answer, while being difficult for illegitimate users to answer. In one embodiment, the question engine 102 can tune multiple questions with some common characteristic as a group by defining a question type associated with the questions. In one embodiment, individual questions or question common to multiple users can be tuned directly.

In one embodiment, the question engine 102 can perform operations 314 to filter questions from one or more sets of questions based on privacy settings determined by the user. For example, in one embodiment, if the user does not wish location based services to send location information to the authentication challenge system 100, or does not wish location information to be used to generate secondary authentication questions, the user can make that selection in the privacy settings.

Figure 4:
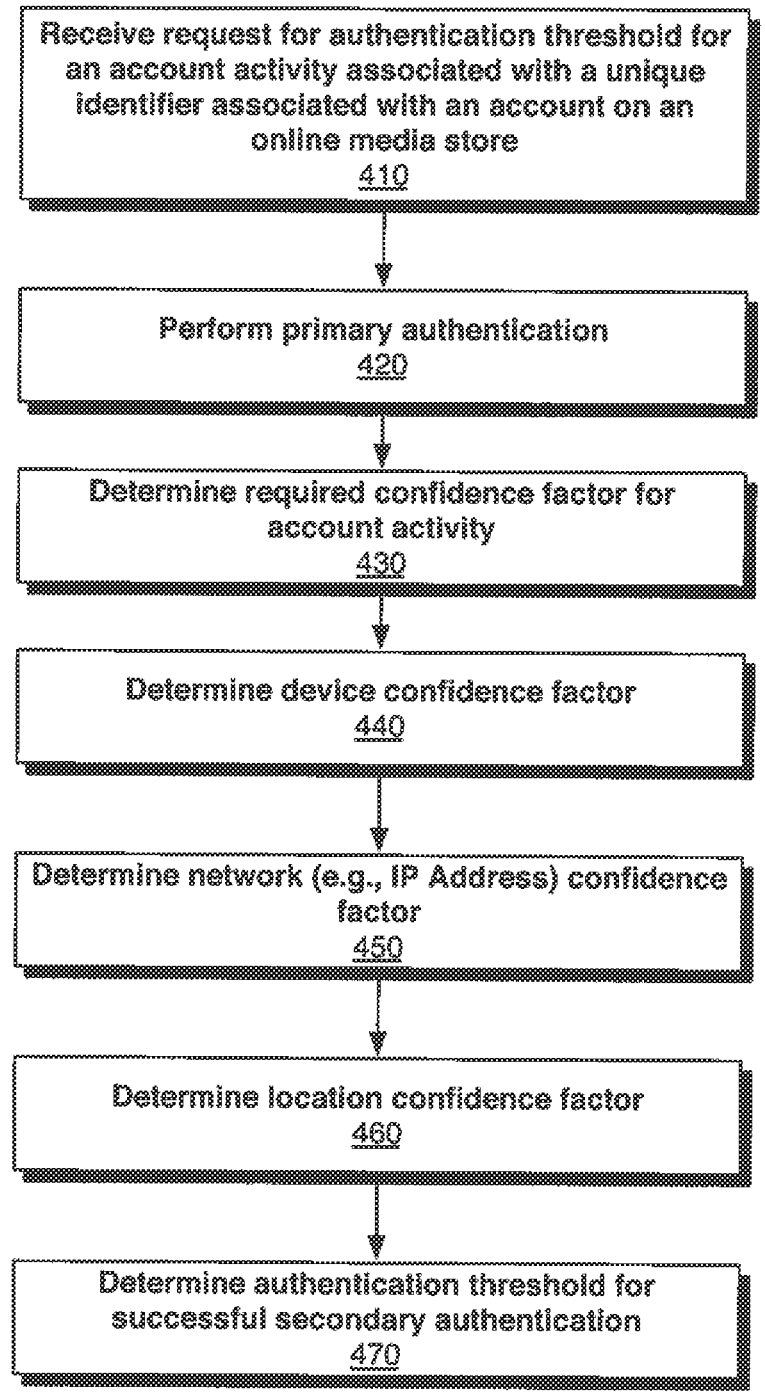
FIG. 4 is a flow diagram of the confidence engine logic according to one embodiment.

FIG. 4 illustrates an example logic flow of the confidence engine 104, according to one embodiment of the authentication challenge system 100. The confidence engine 104 can determine an identity confidence level that reflects the degree of confidence the authentication challenge system has in the authenticity of a user based on recent activity associated with the unique identifier of an account. The confidence engine 104 can lose confidence in a unique identifier associated with an account with the online media store if an analysis of account activities correlates to patterns that reflect a potential attempt to compromise the account. As illustrated in FIG. 2, during authentication challenge system operation 200, the authentication challenge system 100 can perform an operation 208 to determine the threshold confidence level required to perform a requested account activity. As illustrated in the confidence engine logic flow 400, a request 410 for an authentication threshold for a unique identifier associated with an account on an online media store can be handled by the confidence engine 104 to determine the authentication threshold to use before a user can perform a specific account activity. This can begin at operation 420, where the confidence engine can request, or perform a primary account authentication using the unique identifier of the account and a password associated with the identifier. The confidence engine 104 can use details associated with the primary authentication in an assessment of confidence in the user. For example, in one embodiment, if the user passes the primary authentication challenge, and has successfully authenticated with the account, without fail, for a long period of time, and the user is accessing the account from a typical location and a typical network, then the confidence engine 104 can have a high initial confidence in the user.

In one embodiment, the confidence engine 104 can perform an operation 430 to determine the required confidence factor for an account activity. Account actions can differ in severity based on the amount of money involved, or the risk of fraud to the legitimate account user or to other users, artists or application developers associated with the online media store; the required confidence factor correlates generally with the risk of fraud. For example, using the account to purchase a free app from an online app store can be assigned a low confidence threshold. In some instances, account actions with a low confidence threshold can be low enough such that the account activity may not trigger the secondary authentication system if the confidence engine 104 initially has high confidence that the user is a legitimate user. Alternatively, purchasing a $500 application can be assigned a high confidence threshold, such that a user would likely trigger the secondary authentication system under any circumstances, even if the confidence engine 104 has high confidence in the user. However, if a unique identifier associated with an account on, for example, an online app store, has a low initial identity confidence level, even the purchase of a free app, or attempting to rate or review a free app on the online store, can trigger the secondary authentication system. This is because, in some circumstances, fraudulent activity can occur on an online app store where a large number of accounts are compromised and used to artificially uprate a specific application. Similarly, a large number of accounts can be compromised to purchase the media of a specific artist from an online media store. The authentication challenge system 100 can be used in such circumstances to provide an additional level of security using account specific authentication methods to reduce the likelihood an account with compromised primary credentials is used to perform such fraudulent activity.

In one embodiment, the confidence logic flow 400 can be configured to use information associated with the device from which the user is attempting to access the account. For example, an operation 440 to determine a device confidence factor can consider if the account has recently been accessed from one or more new devices that have not previously been used to access the account. An operation 450 can determine a network confidence factor based on the network (for example, the device's Internet Protocol (IP) address) through which the user is accessing the account. Additionally, an operation 460 can determine a location confidence factor based on one or more location sensing services (e.g., global positioning system (GPS) sensors). For example, if a unique identifier associated with an account has recently been accessed from one or more new devices that have not previously been used to access the account, the device can be assessed a low confidence factor. If a device is accessing the account from a new network, the network can be assessed a low confidence factor. If location services indicate that a device is attempting to access the account from a new, or unusual geographic location according to the account history, then the confidence engine 104 can assign a low confidence factor to the location, as this indicates a higher likelihood that the account has been compromised.

In one embodiment, the confidence engine 104 can perform an operation 470 to determine the authentication threshold for a successful secondary authentication. The authentication threshold can be defined as the degree of confidence the authentication challenge system 100 expects before the user can proceed with the selected account activity, based on the assessment of the degree of confidence the system has that the account user is a legitimate user of the account. This threshold can be measured against the systems degree of confidence in the identity of the user. For example, if a user routinely enters a correct password during primary authentication, and the user has recently entered a correct password, and the user is accessing the account from a typical geographic location, using the user's typical network, then if the user attempts to purchase a free application, the authentication threshold for this activity may be set below the confidence level assigned to the unique identifier associated with the user, such that no secondary authentication is triggered. This can also be the case if a legitimate user attempts to use the unique identifier associated with an account to purchase media of the type normally purchased by the user, and the confidence factors indicate a high degree of confidence in the legitimacy of the user.

However, if the account data indicates that primary authentication using the unique identifier has failed repeatedly, the confidence level associated with that unique identifier can be reduced, such that upon the next successful primary authentication, the authentication challenge system 100 uses secondary authentication questions generated by the question engine 102 to perform additional authentication. Additionally, if an illegitimate user attempts to use the account to make a large number of purchases from the online store that are atypical for a legitimate user, the secondary authentication system can prevent the purchases until secondary authentication is successful. If the illegitimate user does not have extensive knowledge of the purchase history, media genre preferences, etc. of the legitimate user of the account, secondary authentication will fail.

Figure 5A:
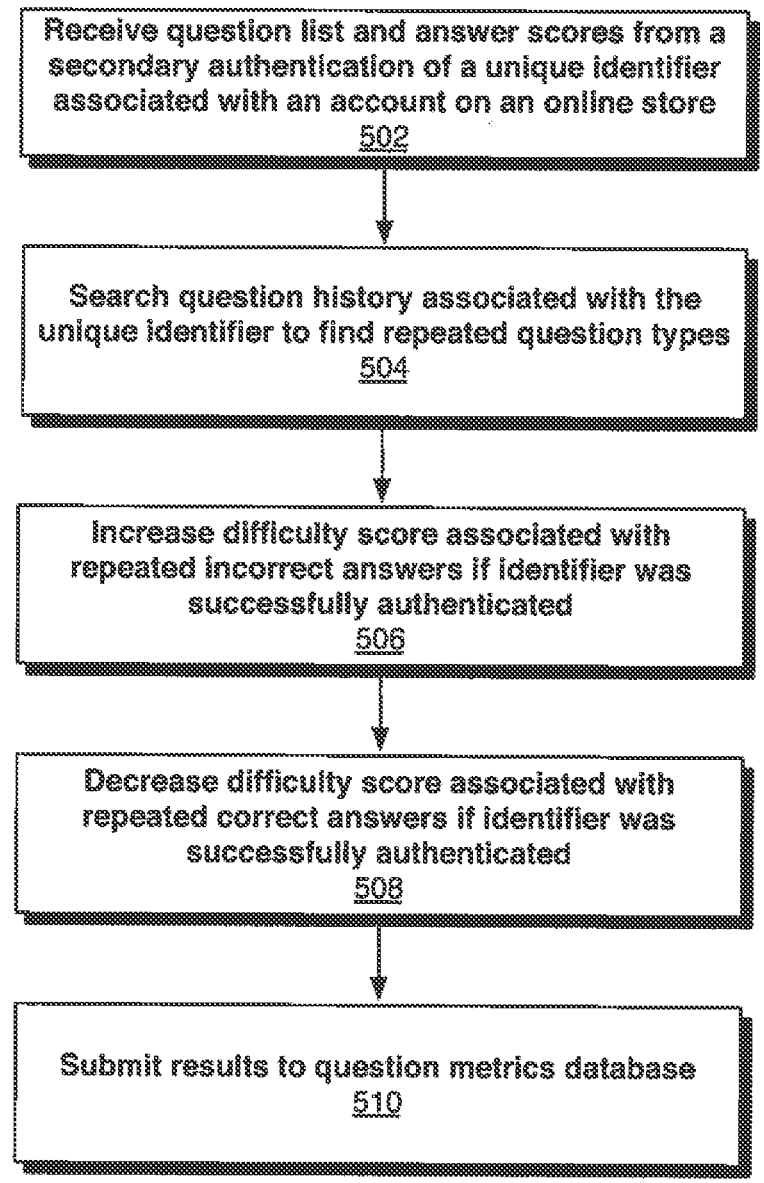
FIG. 5A is a flow diagram of the quality engine when configured to perform a difficulty assessment for generated questions, according to one embodiment.

FIG. 5A illustrates example flow logic of one embodiment of the quality engine 106 when configured to perform a difficulty assessment 500 for generated questions based on question and answer data. In one embodiment, the authentication challenge system can use the quality engine 106 to assess the identifier specific effectiveness of the questions generated by the question engine 102 by determining difficulty scores associated with each question. The question engine 102 can use the difficulty scores to determine which questions are statistically more likely to be answered correctly or incorrectly by authorized users. As shown at block 502, the quality engine difficulty assessment logic 500 can receive a question list and associated answer scores from questions used during one or more secondary authentication challenges of a unique identifier associated with an account on an online store. The list of questions and answers can be submitted after each secondary authentication, or can be stored and submitted periodically.

Once the questions have been received, the quality engine 106 can perform an operation 504 to search the question history associated with the identifier for repeated question types. The question types can be determined from the form and substance of the generated question. For example, if the list of questions from a secondary authentication challenge session contain a multiple choice question based on the music purchase history of the account, then the quality engine 106 can search the question history associated with the account, or the unique identifier associated with the account, to find previous instances in which multiple choice questions based on the music purchase history of the account were used for secondary authentication for the unique identifier.

In one embodiment, secondary authentication can be triggered even when the system has high confidence in the authenticity of the user. For example, a user can configure an account on an online media store to always request secondary authentication. Additionally, the authentication challenge system 100 can be configured to periodically perform secondary authentication without regard to the confidence level associated with the unique identifier. Accordingly, it is possible for a user to answer one or more questions incorrectly without falling below the authentication threshold. In such circumstance, the authentication challenge system 100 can still authorize the user if the user is also able to supply one or more correct answers. In one embodiment, the data generated from the secondary authentication sessions in which a user answers questions incorrectly can be used by the quality engine 106, to supply scoring data to the question engine 102 to improve question generation or selection. There are various reasons why a valid and authorized user may supply an incorrect, or unexpected answer to a secondary authentication question. For example, in some instances the answer to a question can be subjective, such as questions determined based on a presumed media genre preference of the user. In operation 506, the quality engine 106 can increase an authorized user difficulty score associated with questions to which incorrect or unexpected answers are routinely given. In other circumstances, there are questions which successfully authorized users always provide the correct or the expected answer. In one embodiment, the quality engine 106 can perform an operation 508 to decrease an authorized user difficulty score. The questions, answers, and scoring results can be submitted to the question metrics database 110, as shown at block 510.

The question metrics database 110 can be used to aggregate question and answer metrics across the user population. Question metrics can include information such as the frequency a certain type of question is asked, the frequency a certain type of question is answered correctly, the frequency a certain type of question is answered incorrectly, the frequency a certain type of question is filtered by privacy settings, the average difficulty of questions scored from a legitimate user perspective, the average difficulty of questions scored from an illegitimate user perspective, etc. Any number of question metrics can be used, and the system can adapt in real time to determine new metrics. In one embodiment, the quality engine 106 can analyze question metrics to generate a quality score that is delivered to the question engine 102. Multiple factors can be used for quality assessment, but in general, a high quality question is one in which is easy for authorized or legitimate users to answer correctly, but difficult for unauthorized or illegitimate users to answer correctly.

Figure 5B:
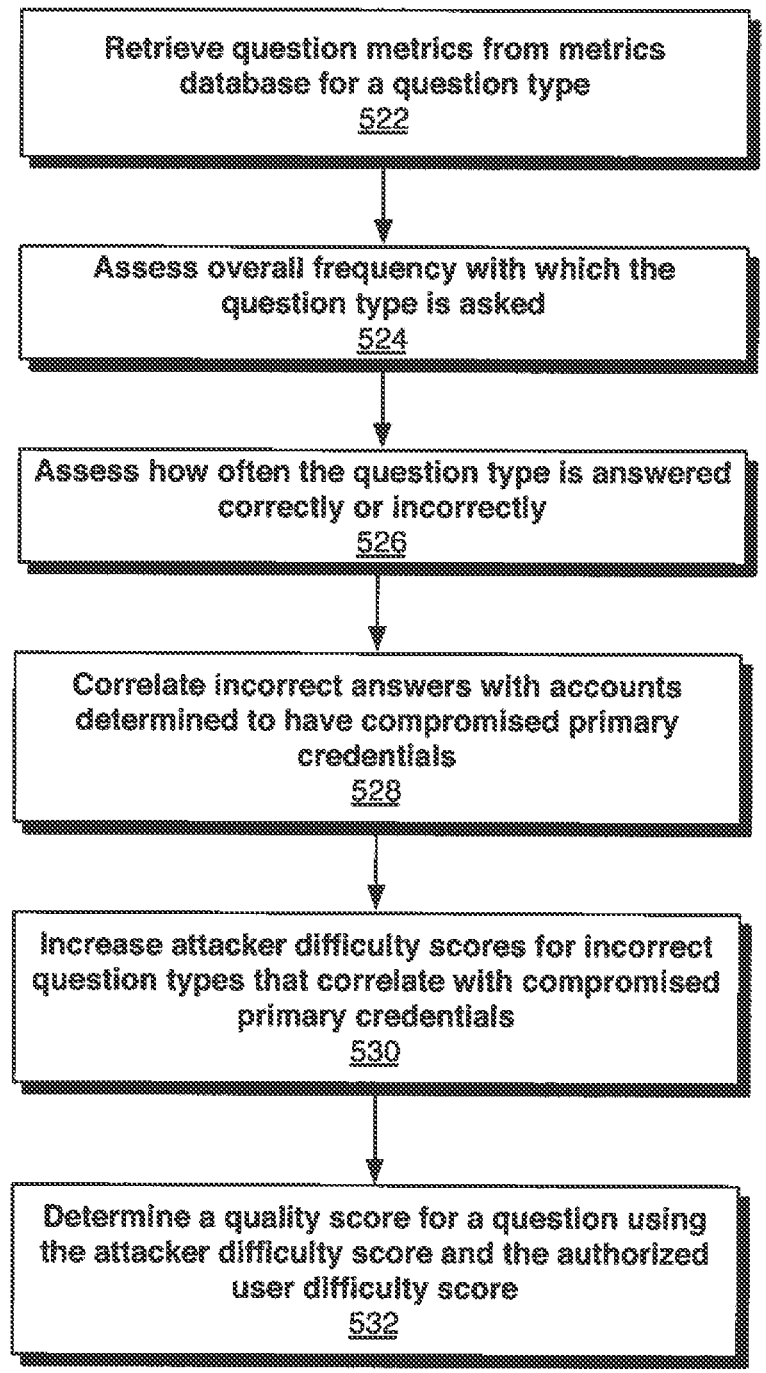
FIG. 5B is a flow diagram of the quality engine when configured to perform an aggregate quality assessment based on question metrics, according to one embodiment.

FIG. 5B illustrates example flow logic of one embodiment of the quality engine 106 when configured to perform an aggregate quality assessment 520 based on question metrics stored in the question metrics database 110. The aggregate quality assessment can be used to determine question types that are statistically determined to be difficult for illegitimate users to answer. In one embodiment, illegitimate user difficulty scores can be analyzed in light of authorized user difficulty scores to generate question quality scores. The question quality scores can be used as an input to the machine-learning algorithm of the quality engine 102 to improve the generated questions.

In one embodiment, the quality engine 106 can perform an operation 522 to retrieve question metrics from question metrics database for set of questions, or a set of question types. The quality engine 106 can perform an operation 524, to assess the overall frequency with which the question or question type is asked. Frequently asked questions, or question types, can provide a stronger basis for statistical analysis. Infrequently asked questions or question types may not provide as strong of a basis for statistical analysis, so those questions can be identified before further analysis to apply an appropriate weight to the analysis of the answer metrics associated with those questions. Additionally, one embodiment of the authentication challenge system 100 can test new, experimental questions with low frequency or only on a subset of the users, and the results can be used as input to a predictive model to project question performance if used on the entire user base.

An operation 526 can be performed to assess how often a specific question or question type is answered correctly or incorrectly. Statistically, correctly answered questions will result in successfully secondary authentication, and it can be useful to scrutinize the set of questions that are routinely answered correctly to determine if the questions are correctly answered by both legitimate and illegitimate users, as determined by the success or failure of secondary authentication. In one embodiment, under certain circumstances, incorrect answers can be provided during a successful secondary authentication session, while correct answers can be provided during an unsuccessful secondary authentication session.

For example, a user that is ultimately determined to be legitimate by the authentication challenge system 100 can, if the initial confidence level is high, answer one or more questions incorrectly. An incorrect question can result in the system losing some degree of confidence based on the difficulty level of the question; however, other questions can be answered correctly such that the confidence level at the end of the secondary authentication session is higher than the threshold for authentication. However, if the initial confidence level associated with the unique identifier associated with the account is low, or if the user answers too many questions incorrectly, the secondary authentication session can result in a failure; the user will not be allowed to perform the requested account action, and metrics associated with a failed secondary authentication can be stored in the question metrics database.

In one embodiment, if a user detects that the primary credentials for the online store account of the user have been compromised, the user can report the incident to the online store to facilitate an investigation to determine if any fraudulent activity occurred on the account. Additionally, the online store can have various methods to detect a compromised account and lock the account from further access. The authentication challenge system can be configured to lock a user account on the online store after one or more failed secondary authentication attempts. In one embodiment, the quality engine 106 can perform an operation 528 to correlate incorrect answers with accounts determined to have compromised primary credentials. When an account is locked due to primary or secondary authentication failure, the authentication challenge system 100 can presume the primary credentials have been compromised. In one embodiment, this presumption can be verified by data from the online store correlating the presumptively compromised credentials with an incident of detected or reported fraudulent activity.

The quality engine can perform an operation 530 to increase attacker difficulty scores associated with questions or question types answered incorrectly based on the correlated fraudulent activity data. When incorrect answers and failed secondary authentication sessions correlate with a presumptively compromised account, an attacker difficulty score can be increased to indicate that a particular question or question type is effective as detecting unauthorized users. In one embodiment, if the data from the online media store verifies the compromised account by associating the presumptively compromised account with detected or reported fraudulent activity, the attacker difficulty score can be increased by an additional amount. In one embodiment, only secondary authentication failures that are verified by actual or attempted fraudulent activity will increase the attacker difficulty score.

In one embodiment, various statistical analysis methods can be used to determine 532 a quality score for a question using the attacker difficulty score and the authorized user difficulty score. The quality score, can generally represent a value that indicates that the question or question type has been statistically verified to be useful for performing secondary authentication because it is easy for authorized users to provide the correct, or expected answer, while being difficult for unauthorized users to provide the correct or expected answer. In one embodiment, the question engine 102 uses a machine-learning algorithm to generate questions of continuously improving quality by using feedback from the quality engine. In one embodiment, the confidence engine 104 can be configured to also use question quality scores to determine the confidence adjustment based on correct or incorrect answers. In one embodiment, the quality engine and confidence engines can be configured to use Bayesian inferences based on a likelihood function to derive posterior probabilities as to the probability that an account has been compromised, or as to the probability that a secondary authentication question is a clear indicator that the user is or is not a valid user. In one embodiment, frequentist inferences can be used to derive probabilities and likelihoods based on a frequency interpretation of events as stored in the account history and the question metrics database. It is to be noted, however, that the methods of analysis used by the logic of the authentication challenge system 100 are not limited to any one statistical model, and unique or hybrid approaches can be used.

Figure 6:
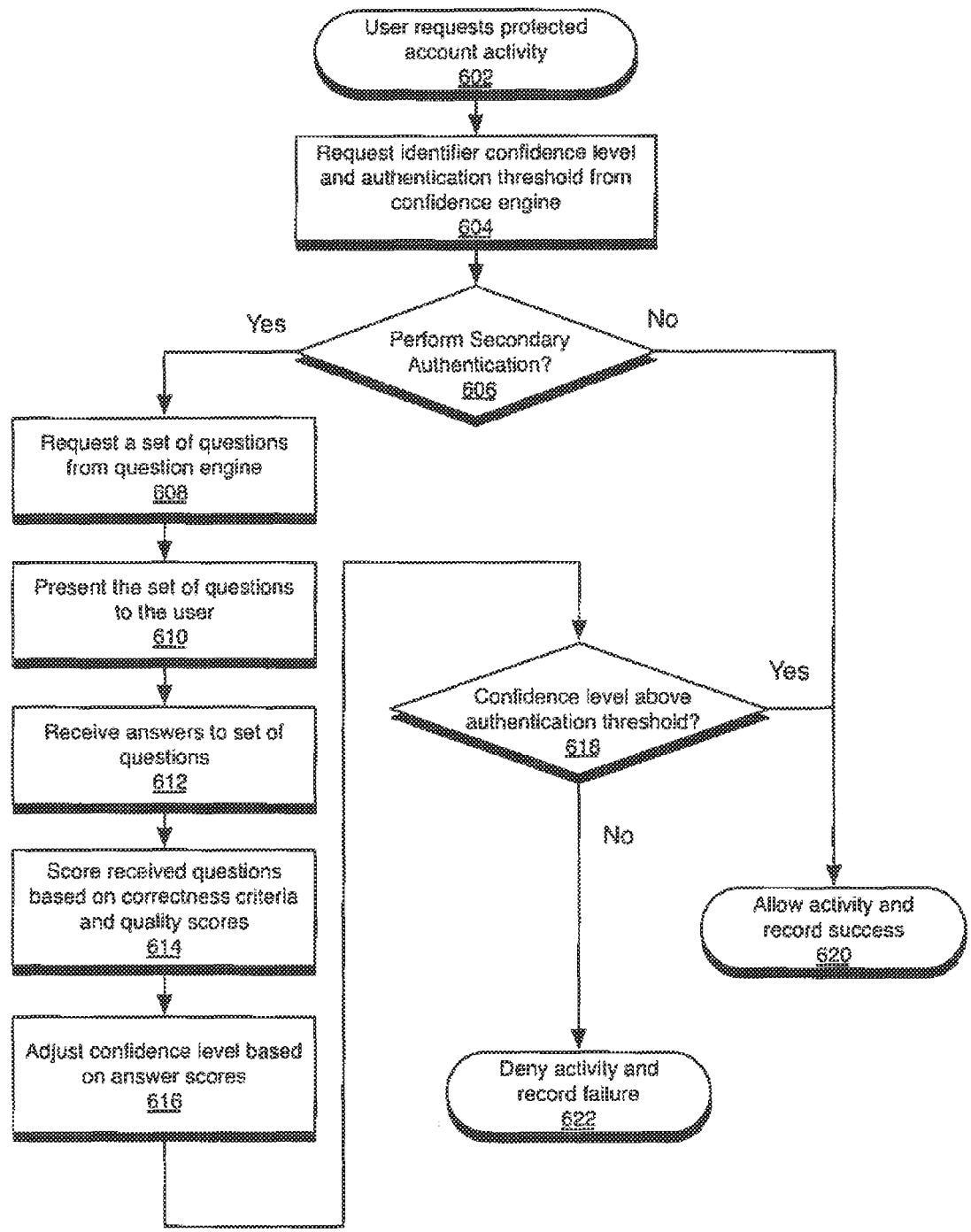
FIG. 6 is flow diagram of the authentication challenge system authorization logic flow according to one embodiment.

FIG. 6 is an example flow diagram of authentication challenge system authorization logic flow 600 according to one embodiment. In one embodiment, the authentication challenge system 100 is enabled when a user requests an account activity that has been flagged as a protected account activity by an online store, or by a user via account preferences or settings, as shown at block 602. In one embodiment, all account activities can be protected by secondary authentication. In one embodiment, specific account activities can be protected by secondary authentication. In one embodiment, some or all account activities are protected whenever an activity confidence factor is determined to be high (e.g., for expensive purchases or when accessing financial information associated with the account) or whenever the confidence level associated with a unique identifier associated with the account is low (e.g., an account has repeated primary authentication failures, or the account purchase history indicates potential fraudulent activities, or other account activities such as app store comments or ratings, indicate a potentially compromised account).

As shown at block 604, the authentication challenge system 100 can request the confidence level of the unique identifier and the authentication threshold from the confidence engine. As shown at block 606, the identifier confidence level and authentication threshold can be used to determine if secondary authentication is performed. In one embodiment, secondary authentication is performed whenever the identifier confidence level is below the authentication threshold. The user is authenticated if the user is able to increase the confidence level associated with the unique identifier above the confidence threshold by supplying a sufficient number of correct or expected answers. In one embodiment, secondary authentication is always performed. If secondary authentication is not performed, and presuming the unique identifier has been subjected to primary authentication within a sufficient timeframe, the account activity is allowed 620 and the system records success.

If secondary authentication is performed, as shown at block 608, a set of questions is requested from the confidence engine, and the questions are presented to the user, as shown at block 610. The system receives answers to the set of questions, as shown at block 612. In one embodiment, the system can score the received answers based on the correctness criteria and quality scores associated with the questions, as shown at block 614. At block 616, the system can adjust the confidence level associated with the unique identifier based on the answer scores. In one embodiment, correct answers provided to questions with high quality scores can result in a larger increase in confidence, and incorrect answers with high quality scores can result in a larger decrease in confidence. In one embodiment, the system can also directly analyze authorized user and attacker difficulty scores to provide alternate, or additional factors for confidence level adjustment. For example, if a question, which is almost always correctly answered by authorized users, is answered incorrectly, then a larger decrease in confidence can result.

As shown at block 618, the system can determine if the post secondary authentication confidence level is above or below the authorization threshold of the requested account activity. If the confidence level exceeds the authorization threshold, the user is authenticated, and the system records a successful secondary authentication for question analysis purposes, as shown at block 620. If the authorization threshold is not met, the system can, as shown at block 622, deny authorization to perform the requested account activity, and a failed secondary authentication is recorded. In one embodiment, a failed secondary authentication can result in an account lockout, and no account activities can be performed unless the user requests an account unlock, either through online store customer service provisions, or through some alternate means, which can use various methods to ensure the user is the true holder of the account.

Figure 7:
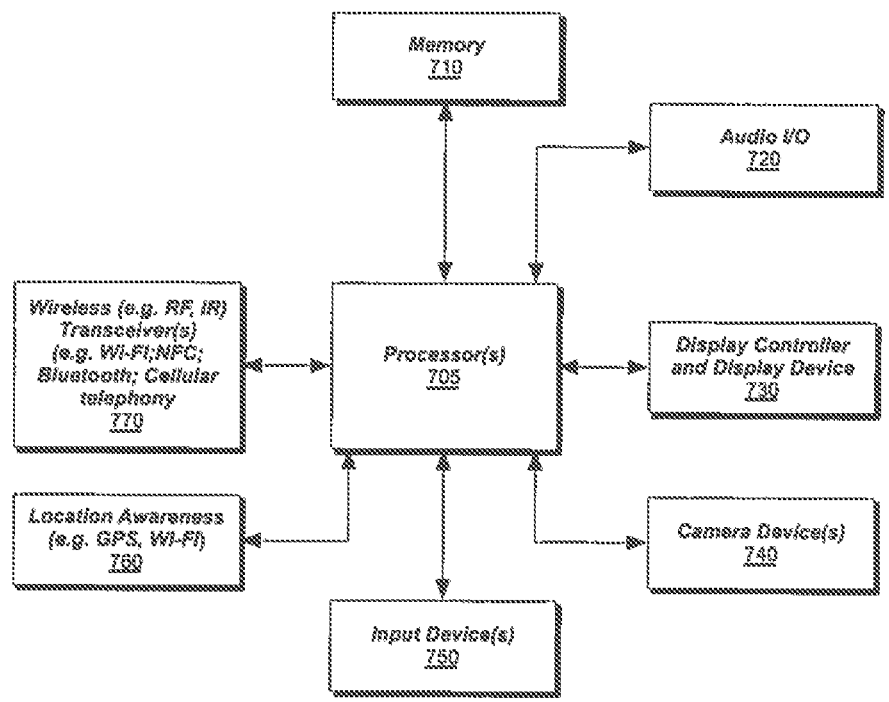
FIG. 7 is a block diagram illustrating one embodiment of a data processing system that can be used in a client device according to one embodiment.

FIG. 7 is a block diagram illustrating one embodiment of a data processing system 700 that can be used in a client device according to embodiments of the invention. In one embodiment, the data processing system of FIG. 7 may be a Macintosh computer, iPhone, iPad, or iPod Touch device, all from Apple Inc. of Cupertino, Calif. The data processing system 700 can include a processing system 705 with one or more microprocessors. The system 700 can also include memory 710 for storing data and programs for execution by the processing system. The system 700 additionally includes an audio input/output subsystem 720 that may include a microphone and a speaker for playing back music or providing telephone functionality through the speaker and microphone.

A display controller and display device 730 can be used to provide a graphical user interface for the user, such as the graphics user interface provided by iOS devices such as, for example, the iPhone, iPad, and iPod touch. A wireless transceiver 770 can transmit and receive data via one or more wireless technologies such as Wi-Fi, infrared, Bluetooth, or one or more variants of wireless cellular technology. One embodiment of system 700 contains one or more camera devices 740 configured in both a front and rear facing configuration, though similarly configured systems each with a front facing camera can be one of many optimal configurations. The data processing system 700 can also include one or more input devices 750 that allow a user to provide input to the system. Input devices can include a keypad or keyboard, alone or in conjunction with a touch or multi touch panel that is overlaid on the display device 730. Additionally, embodiments of the data processing system 700 can also include a device for providing location awareness services, such as a Global Positioning System (GPS) device 760 or its equivalent.

It is to be noted that the data processing system 700 as represented in FIG. 7 is by way of example. One or more buses or interfaces, which are not shown, can be used to interconnect the various components, as is well known in the art. As well, additional components, not shown, may also be part of the system 700 in certain embodiments, and in certain embodiments fewer components than shown in FIG. 7 may also be used.

Figure 8:
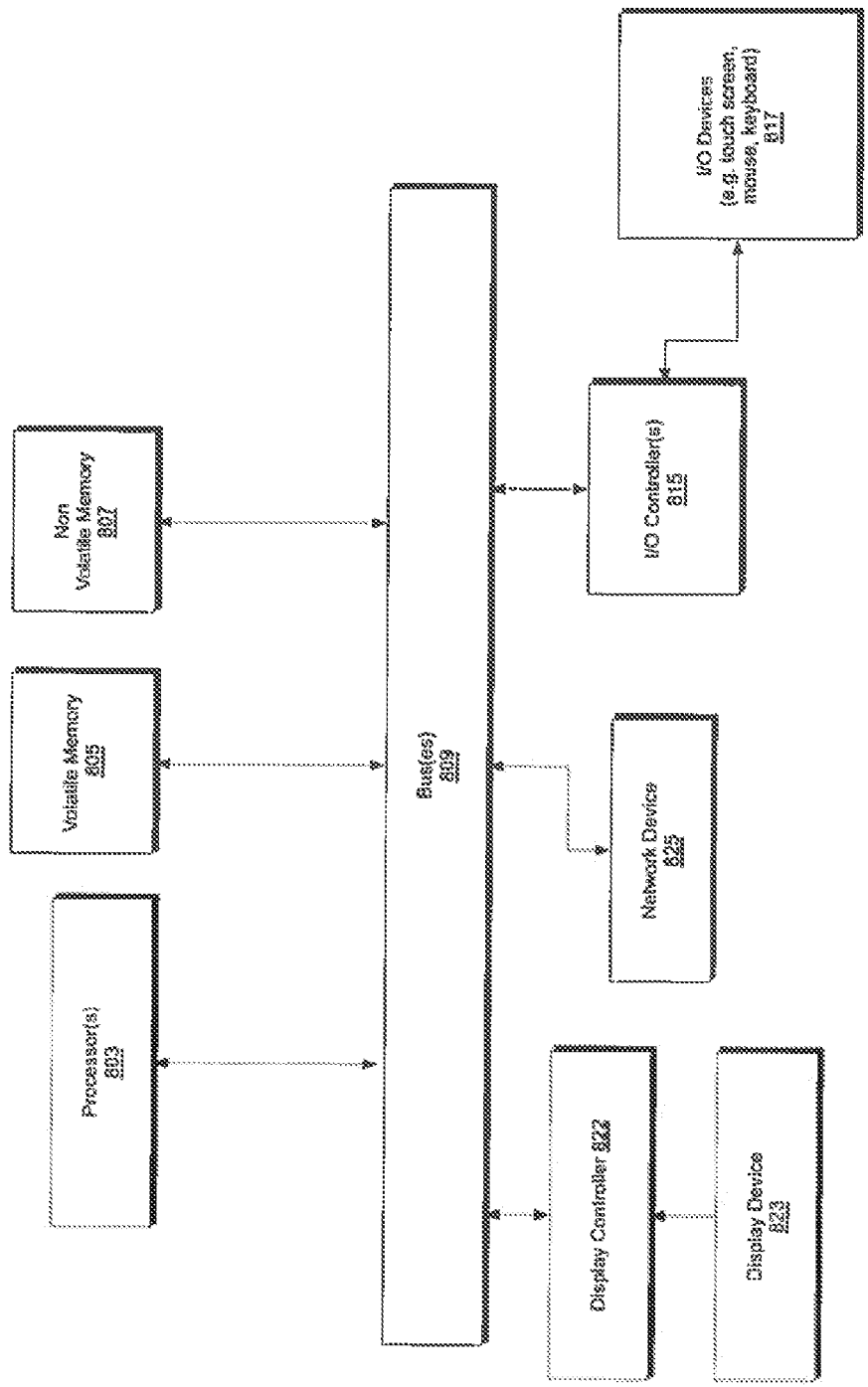
FIG. 8 is a block diagram illustrating one embodiment of a data processing system, which can be used as an asset-purchasing device in conjunction with an online store application, or can be used as an online store server according to embodiments of the invention.

FIG. 8 is a block diagram illustrating one embodiment of a data processing system 800, which can be used as an application or media-purchasing device in conjunction with a store application, or can be used as an online store server according to embodiments of the invention. Note that while FIG. 8 illustrates the various components of a data processing system, such as a computer system, it is not intended to represent any particular architecture or manner of interconnecting the components as such details are not germane to the present invention. It will also be appreciated that other types of data processing systems, which have fewer components than shown or more components than shown in FIG. 8, may also be used with the present invention. As shown in FIG. 8, the data processing system 800 includes one or more buses 809, which serve to interconnect the various components of the system. One or more processors 803, each containing one or more processor cores, are coupled to the one or more buses 809 as is known in the art. Memory 805 may be volatile Sequential DRAM, nonvolatile RAM or may be flash memory or other types of memory. This memory is coupled to the one or more buses 809 using techniques known in the art.

The data processing system 800 can also include nonvolatile memory 807 which may be a hard disk drive or a flash memory or a magnetic optical drive or magnetic memory or an optical drive or other types of memory systems which maintain data after all power is removed from the system. The nonvolatile memory 807 and the memory 805 can both couple to the one or more buses 809 using known interfaces and connection techniques. A display controller 822 is coupled to the one or more buses 809 in order to receive display data to be displayed on a display device 823, which can display any one of the user interface features or embodiments described herein. The display device 823 can include an integrated touch input to provide a touch screen. The data processing system 800 can also include one or more input/output (I/O) controllers 815 which provide interfaces for one or more I/O devices such as one or more mice, touch screens, touch pads, joysticks, and other input devices including those known in the art. The I/O controller can also provide interfaces for one or more output devices (e.g. speakers). The input/output devices 817 are coupled through one or more I/O controllers 815 as is known in the art. Additionally, one or more network interfaces 825 can also be coupled to the one or more buses to provide access to one or more networks.

While FIG. 8 shows that the nonvolatile memory 807 and the memory 805 are coupled to the one or more buses directly rather than through a network interface, it will be appreciated that the data processing system can utilize a nonvolatile memory which is remote from the system, such as a network storage device which is coupled to the data processing system through a network interface such as a modem or Ethernet interface or wireless interface, such as a wireless Wi-Fi transceiver or a wireless cellular telephone transceiver or a combination of such transceivers. As is known in the art, the one or more buses 809 may include one or more bridges or controllers or adapters to interconnect between various buses. In one embodiment, the I/O controller 815 includes a USB adapter for controlling USB peripherals and can control an Ethernet port or a wireless transceiver or combination of wireless transceivers.

It will be apparent from this description that aspects of the present invention may be embodied, at least in part, in software. That is, the techniques and methods described herein may be carried out in a data processing system in response to its processor executing a sequence of instructions contained in a tangible, non-transitory memory such as the memory 805 or the non-volatile memory 807 or a combination of such memories, and each of these memories is a form of a machine readable, tangible storage medium. In various embodiments, hardwired circuitry may be used in combination with software instructions to implement the present invention. Thus the techniques are not limited to any specific combination of hardware circuitry and software or to any particular source for the instructions executed by the data processing system.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense. The present invention can relate to an apparatus for performing one or more of the operations described herein. This apparatus may be specially constructed for the required purposes, or it may comprise a general-purpose computer selectively activated or reconfigured by a computer program stored in the computer.

It will be apparent from this description that aspects of the present invention may be embodied, at least in part, in software. That is, the techniques may be carried out by an apparatus in a data processing system in response to a processor executing a sequence of instructions contained in volatile or non-volatile memory, or a combination of such memories, which together may embody a non-transitory machine readable storage medium. Non-transitory machine readable storage medium comprises any type of machine readable storage medium, including floppy disks, flash memory devices, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, as opposed to media specifically designed or designated for carrying transitory, propagating signals. In various embodiments, software-instructions stored on a machine-readable storage medium can be used in combination with hardwired circuitry to implement the present invention. Thus the techniques are not limited to any specific combination of hardware circuitry and software, or to any particular source for the instructions executed by the data processing system associated an apparatus for performing one or more of the operations described herein.

What is claimed is:

1. A method of generating secondary authentication questions, the method comprising:
   accessing, via one or more hardware processors, an activities history of an account associated with an online store, wherein the online store includes digital media including at least one of music, movies, books or apps;
   deriving a set of questions based on the activities history of an at least quasi-unique identifier associated with the account;
   deriving a set of questions based on a presumed media genre preference associated with the at least quasi-unique identifier;
   filtering questions from one or more sets of questions based on privacy settings;
   transmitting the one or more questions to a device to authenticate the at least quasi-unique identifier associated with the account;
   receiving a set of question metrics gathered during authentication, the set of question metrics related to a frequency in which a type of question is asked or answered;
   submitting the set of question metrics to a metrics database, wherein the set of question metrics includes a frequency in which certain type of question is filtered by privacy settings and the frequency in which a certain type of question is asked;
   receiving an update to a quality score for one or more questions based on the set of question metrics; and
   adjusting the one or more questions based on the update to the quality score.

2. The method as in claim 1, further comprising:
   receiving a periodic quality score update for at least one of the one or more questions; and
   adjusting the at least one of the one or more questions based on the periodic quality score update.

3. The method as in claim 1, further comprising establishing correctness criteria for each set of questions and adjusting one or more questions based on quality score updates.

4. The method as in claim 3 wherein establishing correctness criteria for a set of questions comprises establishing correctness criteria for each question in the set of questions.

5. The method as in claim 1, further comprising:
   adjusting the one or more questions based on the quality score to increase difficulty of the question for a malicious attacker or decrease difficulty of the question for a legitimate user of the account.

6. The method as in claim 1, wherein the set of question metrics additionally includes a frequency in which certain type of question is answered correctly.

7. The method as in claim 6, wherein the set of question metrics additionally includes the frequency in which a certain type of question is answered incorrectly.

8. The method as in claim 1, wherein the activities history includes a purchase history associated with the account.

9. A data processing system comprising:
one or more processors; and
a non-transitory machine readable memory storing instructions which, when executed by the one or more processors, cause the one or more processors to perform operations to:
accessing, via one or more processors, an activities history of an account associated with an online store, wherein the online store includes digital media including at least one of music, movies, books or apps;
derive a set of questions based on the activities history of an at least quasi-unique identifier associated with the account;
deriving a set of questions based on a presumed media genre preference associated with the at least quasi-unique identifier;
filter questions from one or more sets of questions based on privacy settings associated with the account;
transmit one or more adaptively determined authentication questions to a device to authenticate the at least quasi-unique identifier associated with the account;
receive a set of question metrics gathered during authentication, submit the set of question metrics to a metrics database;
receive an update to a quality score for one or more questions based on the set of question metrics, wherein the set of question metrics includes a frequency in which a certain type of question is filtered by privacy settings and the frequency in which a certain type of question is asked; and
adjust the one or more questions based on the update to the quality score.

10. The data processing system as in claim 9, wherein the set of question metrics additionally includes a frequency in which certain type of question is answered correctly or the frequency a certain type of question is answered incorrectly.

11. The data processing system as in claim 9 storing additional instructions to cause the one or more processors to receive a periodic update to the quality score for one or more questions and adjust one or more questions based on the periodic update to the quality score.

12. The data processing system as in claim 9 storing additional instructions to cause the one or more processors to establish correctness criteria for question in each set of questions and adjust one or more questions based on quality score updates.

13. The data processing system as in claim 9, wherein the activities history includes a purchase history associated with the account.

14. The data processing system as in claim 9, storing additional instructions to cause the one or more processors to:
adjust the one or more questions based on the quality score to increase difficulty of the question for a malicious attacker or decrease difficulty of the question for a legitimate user of the account.

15. A non-transitory computer-readable medium storing instructions which, when performed by one or more processors, cause the one or more processors to perform operations comprising:
accessing an activities history of an account associated with an online store, wherein the online store includes digital media including at least one of music, movies, books or apps;
deriving a set of questions based on the activities history of an at least quasi-unique identifier associated with the account;
deriving a set of questions based on a presumed media genre preference associated with the at least quasi-unique identifier;
filtering questions from one or more sets of questions based on privacy settings;
transmitting the one or more questions to a device to authenticate the at least quasi-unique identifier associated with the account;
receiving a set of question metrics gathered during authentication;
submitting the set of question metrics to a metrics database, wherein the set of question metrics includes a frequency in which certain type of question is filtered by privacy settings and the frequency in which a certain type of question is asked;
receiving a periodic update of a quality score for one or more questions based on the set of question metrics; and
adjusting the one or more questions based on the periodic update to the quality score.

16. The non-transitory computer-readable medium as in claim 15, wherein the activities history includes a purchase history associated with the account.

17. The non-transitory computer-readable medium as in claim 15, the operations further comprising establishing correctness criteria for each set of questions and adjusting one or more questions based on quality score updates.

18. The non-transitory computer-readable medium as in claim 17, wherein establishing correctness criteria for a set of questions comprises establishing correctness criteria for each question in the set of questions.

19. The non-transitory computer-readable medium as in claim 15, wherein the set of question metrics additionally includes a frequency in which certain type of question is answered correctly or the frequency a certain type of question is answered incorrectly.

20. The non-transitory computer-readable medium as in claim 15, further comprising adjusting the one or more questions based on the quality score to increase difficulty of the question for a malicious attacker or decrease difficulty of the question for a legitimate user of the account.

* * * * *